Figure 1:
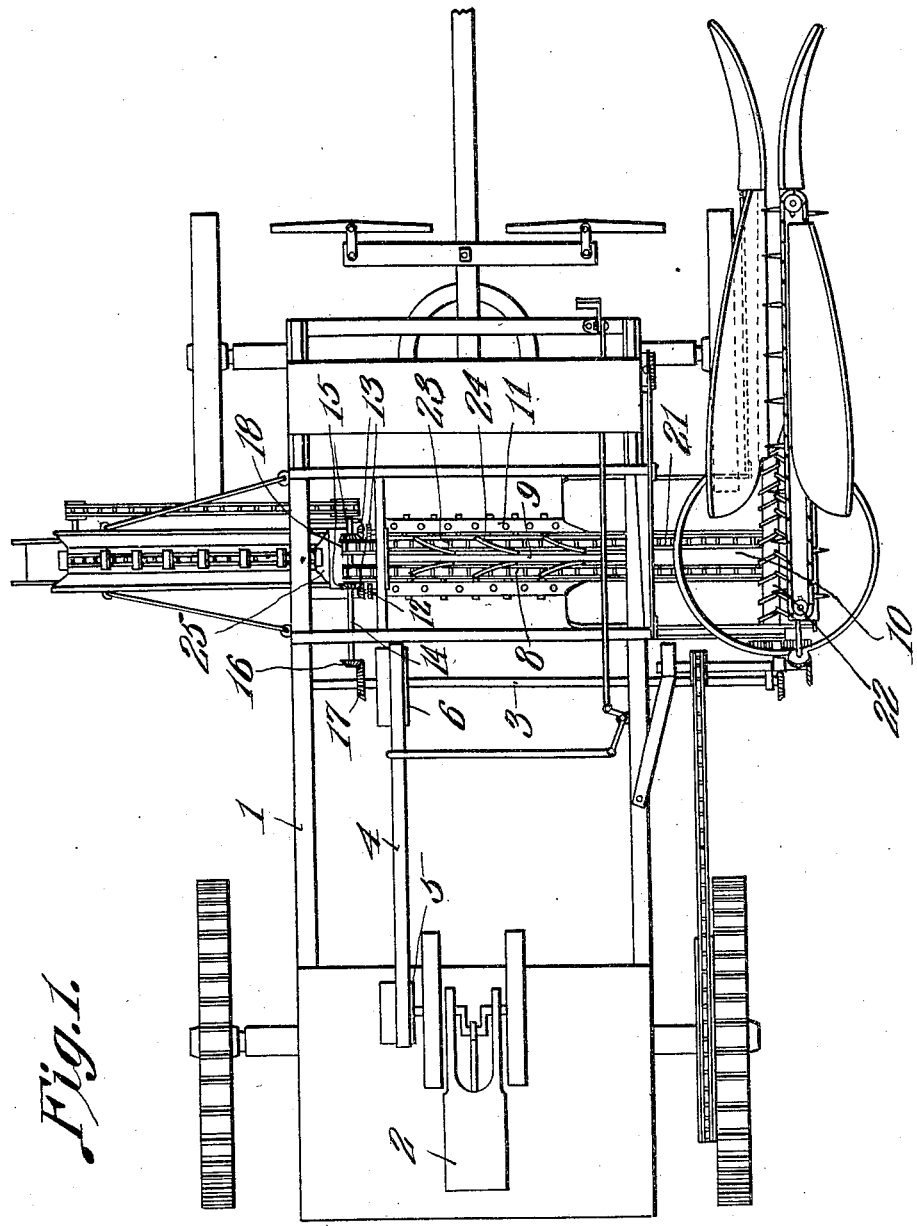

W. SMOLLEY.
CORN HUSKER.
APPLICATION FILED JULY 13, 1910.

998,928.

Patented July 25, 1911.

2 SHEETS—SHEET 1.

Witnesses

Wayne Smolley,
Inventor by C. A. Snow & Co.
Attorneys

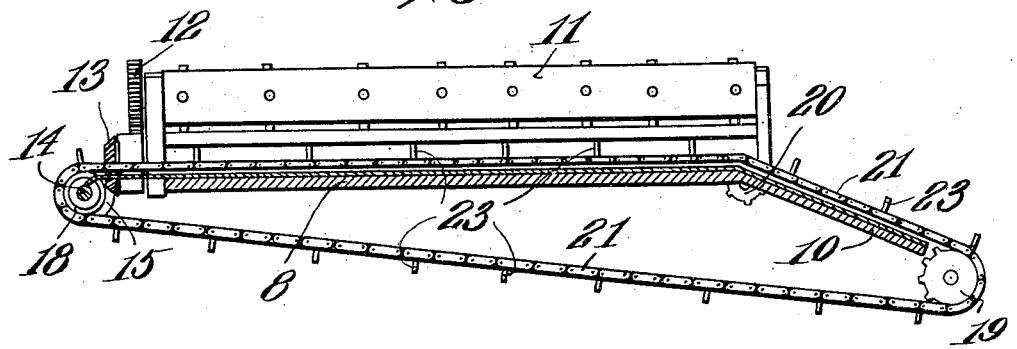
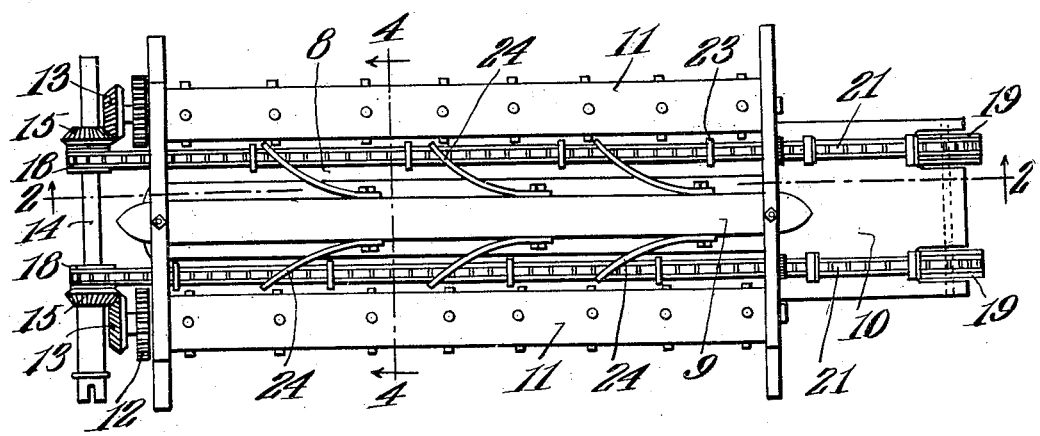
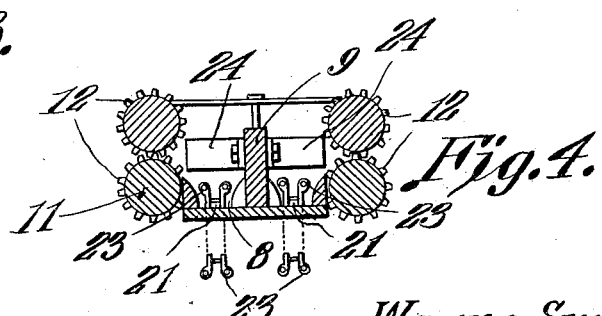

UNITED STATES PATENT OFFICE.

WAYNE SMOLLEY, OF BROOKVILLE, INDIANA.

CORN-HUSKER.

998,928.

Specification of Letters Patent.  Patented July 25, 1911.

Application filed July 13, 1910. Serial No. 571,340.

*To all whom it may concern:*

Be it known that I, WAYNE SMOLLEY, a citizen of the United States, residing at Brookville, in the county of Franklin and State of Indiana, have invented a new and useful Corn-Husker, of which the following is a specification.

This invention has relation to corn huskers and consists in the novel construction and arrangement of its parts as hereinafter shown, described and claimed.

The object of the invention is to provide a corn husker especially adapted to be used in combination with a wheel mounted corn gatherer and with this object in view, the husker includes a trough having a downwardly inclined receiving end and a partition extending longitudinally thereof which divides the said trough into two passages. Conveyers are mounted for movement along the said passages and the inclined receiving end portion of the trough and husking rolls are journaled at the side edges of the trough, and springs are mounted upon the said partition and are adapted to direct ears as they pass through the passages toward the husking rolls.

In the accompanying drawings—Figure 1 is a top plan view of a corn gatherer with the husker applied thereto. Fig. 2 is a longitudinal sectional view of the husker. Fig. 3 is a top plan view of the husker. Fig. 4 is a transverse sectional view of the husker.

As hereinbefore stated and as illustrated in Fig. 1 of the drawings, the husker is especially designed to be used in combination with a wheel mounted corn gatherer and so much of the said gatherer is shown in detail as to give a clear understanding of the operation of the husker. The frame of the corn gatherer is indicated at 1 and an engine 2 is mounted thereon. A master shaft 3 is journaled for rotation upon the frame 1 and is operatively connected with the shaft of the engine 2 by means of a belt 4 and pulleys 5 and 6 mounted respectively upon the engine and master shaft.

The husker consists of a trough 8 which is supported by the frame 1 and extends transversely under the same. The said trough is provided with a longitudinally disposed partition or wall 9 which divides the same into ear passages. The receiving end of the trough 8 is downwardly disposed as at 10. Husking rolls 11 are journaled for rotation at the side edges of the trough 8 and the said rolls are arranged in pairs in the usual manner, one roll of each pair being above the other roll of the pair. The husking rolls of each pair are provided with intermeshing gear wheels 12 and the shafts of the lower husking rolls are provided with beveled pinions 13.

A shaft 14 is journaled for rotation at the side of the frame 1 and beyond the delivery end of the trough 8 and is provided with beveled pinions 15 which mesh with the beveled pinions 13. A beveled pinion 16 is fixed to the shaft 14 and meshes with a beveled pinion 17 fixed to the shaft 6. Thus it will be seen that means are provided for transmitting rotary motion from the shaft 6 to the husking rolls 11. Sprocket wheels 18 are fixed to the shaft 14, one in alinement with each of the ear passages provided in the trough 8 and sprocket wheels 19 are journaled at the receiving ends of the ear passages through the trough 8 and at the lowermost portion of the inclined section 10 of the said trough 8. Sprocket wheels 20 are journaled at the bottom of the trough 8 at the uppermost end of the inclined section 10 of the said trough 8 and sprocket chains 21 are arranged to move about the sprocket wheels 18, 19 and 20. A chain 21 traverses the length of each of the ear passages provided in the trough 8 and the said chains 21 are provided at intervals along their length with lugs 23 which are adapted to engage the ears and carry the same through the passages provided in the said trough in the usual manner. Flat springs 24 are attached at their ends to the partition 9 provided in the trough 8 and the free ends of the said springs 24 are disposed toward the side edges of the trough 8 and the said springs are designed to serve as means for forcing the ears as they pass through the ear passages provided in the said trough toward the husking rolls 11. By reason of the fact that the springs are attached at their ends disposed toward the receiving end of the trough 8 to the partition 9, and are free at their other ends the said springs will permit the ears to pass by their free ends but their free ends will serve to hold the ears toward the husking rolls while in transit.

As the corn gatherer is drawn along a row of standing stalks, the said stalks are engaged by the snapping rolls 22 which are operatively connected with the engine 2 and the ears are broken from the stalks by the said snapping rolls in the usual manner and fall upon the inclined section 10 of the trough 8. The ears thus deposited are encountered by the lugs 22 mounted upon the chains 21 and are carried up the inclined section 10 and moved through the ear passages provided in the trough 8. During the movement of the ears through the passages they are forced toward the husking rolls 11 and the husks are removed in the usual manner while the ears during the process of husking are moved longitudinally along the ear passages provided in the trough 8. If during the process of removing the husks from the ears any of the grain is separated from the cob, the said grain is swept by the chains 21 toward the delivery end of the trough 8 and from the delivery end of the said trough, the said separated grain will fall into a receptacle 25 provided at the end of the trough. During the movement of the ears along the passages in the trough 8 the said springs 24 will force the ears toward the husking rolls 11 in the manner as hereinbefore described.

Having described the invention what I claim as new and desire to secure by Letters Patent is:—

In a corn husker a trough having a closed bottom, husking rolls journaled at the side thereof and being located vertically one above the other, a conveyer mounted for movement along the bottom of the trough parallel with the axes of the rolls, a wall fixed with relation to the trough and located at the side of the conveyer opposite that side thereof at which the husking rolls are located and springs fixed at one end to the wall and extending over the conveyer and terminating in the vicinity of the adjacent side portions of the husking rolls.

In testimony that I claim the foregoing as my own, I have hereto affixed my signature in the presence of two witnesses.

WAYNE SMOLLEY.

Witnesses:
 GEO. E. MULLIN,
 HERMAN TRICHLER.